United States Patent
Wommack et al.

[11] Patent Number: 5,997,599
[45] Date of Patent: *Dec. 7, 1999

[54] SOIL CONDITIONING AGGLOMERATES CONTAINING CEMENT KILN DUST

[75] Inventors: Greg Wommack, Silex, Mo.; Carl Holley, Riverview, Mich.; Eugene Greskovich, State College, Pa.

[73] Assignee: Magic Green Corporation, Silex, Mo.

[ * ] Notice: This patent is subject to a terminal disclaimer.

[21] Appl. No.: 09/067,064

[22] Filed: Apr. 27, 1998

Related U.S. Application Data

[63] Continuation of application No. 08/672,226, Jul. 5, 1996, Pat. No. 5,743,934, which is a continuation-in-part of application No. 08/398,657, Mar. 3, 1995, abandoned.

[51] Int. Cl.$^6$ .............................. C05B 9/00; C05B 15/00; C05B 19/00; C05D 3/00; C05D 9/00

[52] U.S. Cl. ........................... 71/11; 71/11; 71/27; 71/28; 71/29; 71/30; 71/31; 71/32; 71/33; 71/58; 71/59; 71/64.01; 71/64.03; 71/64.05; 23/313 R; 23/313 P

[58] Field of Search ................................. 71/28, 29, 30, 71/47, 53, 60, 63, 64.13, 903, 904; 23/313 R, 313 P

[56] References Cited

U.S. PATENT DOCUMENTS

| | | | |
|---|---|---|---|
| 1,721,803 | 7/1929 | Carson . | |
| 2,904,425 | 9/1959 | Kippe | 71/63 |
| 3,169,054 | 2/1965 | Werner | 75/3 |
| 3,214,261 | 10/1965 | Galloway | 71/51 |
| 3,303,016 | 2/1967 | Boukidis | 71/62 |
| 3,660,068 | 5/1972 | Wilson | 71/34 |
| 3,692,511 | 9/1972 | Wilson et al. | 71/29 |
| 3,883,281 | 5/1975 | Holley | 425/222 |
| 4,001,030 | 1/1977 | Watson et al. | 106/100 |
| 4,013,442 | 3/1977 | Kawar | 72/28 |
| 4,015,973 | 4/1977 | Perrine | 71/63 |
| 4,354,876 | 10/1982 | Webster | 106/85 |
| 4,385,928 | 5/1983 | Clevely | 75/3 |
| 4,402,891 | 9/1983 | Kachinski, Jr. | 264/40.1 |
| 4,407,677 | 10/1983 | Wills, Jr. | 106/97 |
| 4,410,350 | 10/1983 | Judd | 71/63 |

(List continued on next page.)

FOREIGN PATENT DOCUMENTS

| | | | |
|---|---|---|---|
| 2077508 | 3/1993 | Canada | C05F 7/00 |
| 28 26 756 | 12/1979 | Germany | C05D 11/00 |

OTHER PUBLICATIONS

Ferro–Tech General Catalog (277 pages).

Carl A. Holley., "Waste Agglomeration," Ferro–Tech Catalog, pp. 99–125, presented at the Institute for Briquetting and Agglomeration, New Orleans, Louisiana, Nov. 5–8, 1989.

"The Ferro–Tech Turbulator™, " Ferro–Tech Catalog, pp. 269–271, Feb. 3, 1987.

Carl A. Holley, "Binders and Binder Systems for Agglomeration," Ferro–Tech Catalog, pp. 77–86, presented at the 17$^{th}$ Biennial Conference of the Institute for Briquetting and Agglomeration, Reno, Nevada, Aug. 1981.

Carl A. Holley, "Agitative Agglomeration — The State of the Art (1987)," Ferro–Tech Catalog, pp. 59–75.

(List continued on next page.)

*Primary Examiner*—Gary P. Straub
*Assistant Examiner*—Eileen E. Nave
*Attorney, Agent, or Firm*—Senniger, Powers, Leavitt & Roedel

[57] ABSTRACT

Mechanically strong, water-disintegrable agglomerates for use as a soil conditioner produced from dust particles emitted from kilns during the manufacture of cement and a process for forming such agglomerates are disclosed. The process comprises combining cement kiln dust and a water-soluble binder to produce agglomerates which are then subjected to controlled drying such that the dried agglomerates having a size ranging from −7 to +8 Tyler Standard Sieve Series exhibit an average green crush strength of at least about 2 pounds (about 0.9 kg).

32 Claims, 1 Drawing Sheet

U.S. PATENT DOCUMENTS

| | | | |
|---|---|---|---|
| 4,432,800 | 2/1984 | Kneller et al. | 106/85 |
| 4,465,520 | 8/1984 | Jehmlich et al. | 106/100 |
| 4,554,004 | 11/1985 | Bierman et al. | 71/29 |
| 4,584,179 | 4/1986 | Galli | 422/187 |
| 4,726,755 | 2/1988 | Holley | 425/222 |
| 4,881,887 | 11/1989 | Holley | 425/222 |
| 4,954,134 | 9/1990 | Harrison et al. | 23/313 |
| 5,008,055 | 4/1991 | Holley | 264/117 |
| 5,085,681 | 2/1992 | Boukidis | 71/29 |
| 5,173,232 | 12/1992 | Holley | 264/113 |
| 5,186,741 | 2/1993 | Kotraba et al. | 75/484 |
| 5,196,043 | 3/1993 | Wurtz | 71/12 |
| 5,228,895 | 7/1993 | Kelly et al. | 71/63 |
| 5,252,116 | 10/1993 | Markham et al. | 71/13 |
| 5,328,497 | 7/1994 | Hazlett | 71/28 |
| 5,698,002 | 12/1997 | Hudson | 71/28 |
| 5,743,934 | 4/1998 | Wommack et al. | 71/28 |

OTHER PUBLICATIONS

Carl A. Holley, "Cement Kiln Dust Utilization and Treatment," Ferro–Tech Catalog, pp. 163–165, Aug. 29, 1983.

Davis, et al., "Disposal and Utilization of Waste Kiln Dust from Cement Industry" National Technical Information Service, Industry pp. i–viii and 1–54, May 1975.

Risser, et al., "Cement Kiln Dust Useful as Lime–Potash Fertilizer", Science in Agriculture, vol. 28, No. 2, pp. 6–7, Winter 1981.

Lierop, et al., "Evaluation of Cement Kiln Flue Dust as a Potassium and Sulfate Fertilizer", Commun. In Soil Sci. Plant Anal., 13(3), pp. 157–173, 1982.

Dale E. Baker, "Fly–Ash as a Soil Amendment or Soil Substitute" Oct. 16, 1990.

Burnham, et al., Use of Kiln Dust with Quicklime for Effective Municipal Sludge Pasteurization and Stabilization with the N–Viro Soil Process, pp. 128–141, 1992.

"An Analysis of Selected Trace Metals in Cement and Kiln Dust", Portland Cement Association, 1992.

Waldemar A. Klemm, "What are CKD's Uses and Characteristics?" Rock Products Cement Edition, pp. 38–44, 1994.

Borregaard Lignotech, "Lignin Products", Publication 800E.

A Reference Guide to Specialty Chemicals by Reed Lignin, "The Lignin Story".

Wolfgang Pietsch "Successfully Use Agglomeration for Size Enlargement", Chemical Engineering Progress, pp. 29–45, Apr., 1996.

Baker et al., "Baker Soil Test® Development and Field Case Studies Provide Theory and Data Showing that Plants Don't Grow in Soils", 1996.

Magic Green Corporation "Vision & Concepts for the Future", Jun., 1996.

Magic Green Corporation, "Farmer to Farmer A Profit Building Approach for the $21^{st}$ Century", Feb. 26, 1996.

Thomas L. O'Meara, "The Calcium Connection".

J. Patrick Nicholson, "Resource Conservation and Utilizaiton—A Magnificent Opportunity", presented at the European Conference on Sludge and Organic Waste, Yorkshire, UK, Apr. 12–15, 1994.

Advertisement for N–Viro Soil™, N–Viro International Corporation.

Derwent World Patent Index (WPI) abstract for Soviet Union Patent No. 176595, 1994.

Derwent World Patent Index (WPI) abstract for Soviet Union Patent No. 220277, 1994.

SOIL CONDITIONING AGGLOMERATES CONTAINING CEMENT KILN DUST

This application is a continuation of U.S. patent application Ser. No. 08/672,226, filed Jul. 5, 1996, now U.S. Pat. No. 5,743,934, which is a continuation-in-part of U.S. patent application Ser. No. 08/398,657, filed Mar. 3, 1995, now abandoned, the disclosures of which are incorporated herein by reference.

BACKGROUND OF THE INVENTION

The present invention relates to mechanically strong, water-disintegrable agglomerates for use as a soil conditioner produced from dust particles emitted from kilns during the manufacture of cement. The present invention also relates to a process for forming such agglomerates.

The manufacture of cement is accompanied by the generation of large quantities of dust entrained in the hot stack gases vented from cement kilns. In order to prevent air pollution, a variety of dust collecting apparatus (e.g., bag houses, electrostatic precipitators) are used to collect cement kiln dust from the gaseous effluents of the kiln. Preferably, the collected cement kiln dust is recycled to the cement kiln as part of the raw material feed. However, cement kiln dust often contains unacceptably high levels of alkali (e.g., sodium and potassium) which make it unsuitable for return to the cement-making process. Alkali present in cement kiln dust recycled to the kiln eventually finds its way into the clinker product. High alkali content in the clinker has an adverse effect on the rate at which concrete made from the clinker gains strength and may also lead to slow, insidious deterioration of the concrete due to the reaction between the alkali and amorphous silica contained in the aggregate.

If the raw materials fed to the kiln are high in alkali content, some of the alkali must be removed from the cement making process in order to avoid the problems associated with elevated alkali levels in the clinker. Since alkalies present in the kiln feed tend to accumulate in the dust entrained in the kiln stack gases, discarding the collected dust is one way to control the alkali content of the clinker. The discarded dust is often disposed of by simply piling it adjacent the cement plant facility or hauling it to an abandoned quarry or other landfill. These disposal methods often lead to pollution of surface and ground waters as the water-soluble alkalies present in the dust are leached out by water percolating through the dust piles. In order to prevent pollution problems, cement manufacturers are required to invest considerable resources in cleaning up runoff from cement kiln dust storage before releasing it to the environment.

Over the years, several uses for discarded cement kiln dust directed at reclaiming this sizeable waste stream and avoiding the costs associated with dust disposal have been proposed and implemented with varying degrees of success. Agricultural use of cement kiln dust presents one of the most promising ways to convert discarded cement kiln dust into a valuable by-product of cement manufacture. See T. A. Davis, et al., "Disposal and Utilization of Waste Kiln Dust From Cement Industry", EPA Report No. 670/2-75-043 (May 1975). Two properties of cement kiln dust make it useful for application to cultivated soils: (1) an acid neutralization capacity which is about 80% of that of slaked or hydrated lime ($Ca(OH)_2$) and comparable to that of pulverized limestone ($CaCO_3$); and (2) high concentrations of potassium, calcium and sulfur which are important soil nutrients. In the agricultural industry, large amounts of hydrated lime, limestone, dolomitic limestone ($CaOMgO \cdot 2CO_2$) and quicklime (CaO) are used as liming agents to reduce soil acidity and provide a source of calcium. Agricultural uses alone could consume almost all of the cement kiln dust presently being discarded.

One serious hindrance to expanded agricultural use of cement kiln dust are the problems associated with its storage, handling and application to soils. Raw cement kiln dust is extremely fine, typically consisting of particles having an average particle size much less than about 100 μm, with a large portion of particles often having a particle size less than about 6 μm. As a result, the dust is easily carried away by the wind and is difficult to bulk-blend with other materials in preparing various fertilizer formulations. Furthermore, modern fertilizer application equipment for broadcast or row placement of solid fertilizers, is designed for handling free-flowing, granular or pelletized materials having an appreciable mean diameter, not dust. Consequently, numerous problems are encountered when such equipment is employed for field application of finely-divided cement kiln dust.

It has been proposed that one way to overcome these shortcomings would be to develop a process for granulating or agglomerating cement kiln dust to produce a mechanically strong pellet. See Soviet Patent 220277.

SUMMARY OF THE INVENTION

Among the objects of the present invention, therefore, are the provision of a process for forming an agglomerate containing cement kiln dust particles for use as a soil conditioning agent; the provision of such a process which produces an agglomerate having sufficient mechanical strength to withstand the rigors of handling, transport and application without excessive dusting; and the provision of such a process which produces an agglomerate which disintegrates readily into particles having substantially the same size as the raw materials used to form the agglomerate once the agglomerate is incorporated into soil and exposed to water so that the various beneficial components of the agglomerate may be rapidly utilized by the soil.

Briefly, therefore, the present invention is directed to a process for forming an agglomerate containing cement kiln dust for use as a soil conditioning agent to neutralize soil acidity and provide a source of nutrient values. The process comprises pelletizing a preagglomerate containing a particulate calcium source comprising cement kiln dust and a water-soluble binder. The combined concentration of CaO and other calcium-containing compounds having the potential to be hydrated in the preagglomerate is no greater than about 10% by weight. The preagglomerate is pelletized by conventional tumble or growth agglomeration to form the agglomerate. Once formed, the agglomerate is dried. Drying of the agglomerate is controlled such that dried agglomerates having a size ranging from −7 to +8 Tyler Standard Sieve Series exhibit an average green crush strength of at least about 2 pounds (0.9 kg).

The invention is further directed to an agglomerate for use as a soil conditioner to neutralize soil acidity and provide a source of nutrient values. The agglomerate comprises a particulate calcium source comprising cement kiln dust and a water-soluble binder. The particulate calcium source has a particle size distribution such that less than about 1% by weight of the particulate calcium source is +20 mesh and less than about 10% by weight of the particulate calcium source is −20 +100 mesh Tyler Standard Sieve Series.

The invention is further directed to an agglomerate for use as a soil conditioner to neutralize soil acidity and provide a source of nutrient values. The agglomerate comprises about 15% to about 60% by weight of a particulate calcium source comprising cement kiln dust and about 40% to about 80% by weight of a primary plant nutrient source providing a source of available nitrogen.

The invention is further directed to an agglomerate for use as a soil conditioner to neutralize soil acidity and provide a source of nutrient values. The agglomerate comprises about 15% to about 60% by weight of a particulate calcium source comprising cement kiln dust and about 30% to about 80% by weight of a primary plant nutrient source providing a source of potassium.

The invention is further directed to a mechanically-strong, water-disintegrable agglomerate for use as a soil conditioner to neutralize soil acidity and provide a source of nutrient values. The agglomerate comprises cement kiln dust and a water-soluble binder. Agglomerates having a size ranging from −7 to +8 Tyler Standard Sieve Series exhibit an average green crush strength of at least about 2 pounds, and readily dissolving upon exposure to water to disintegrate into cement kiln dust particles having substantially the same size as the original dust, thereby allowing the agglomerates to serve as an effective soil conditioning agent.

Other objects and features of this invention will be in part apparent and in part pointed out hereinafter.

DETAILED DESCRIPTION OF THE PREFERRED EMBODIMENTS

Figure 1:
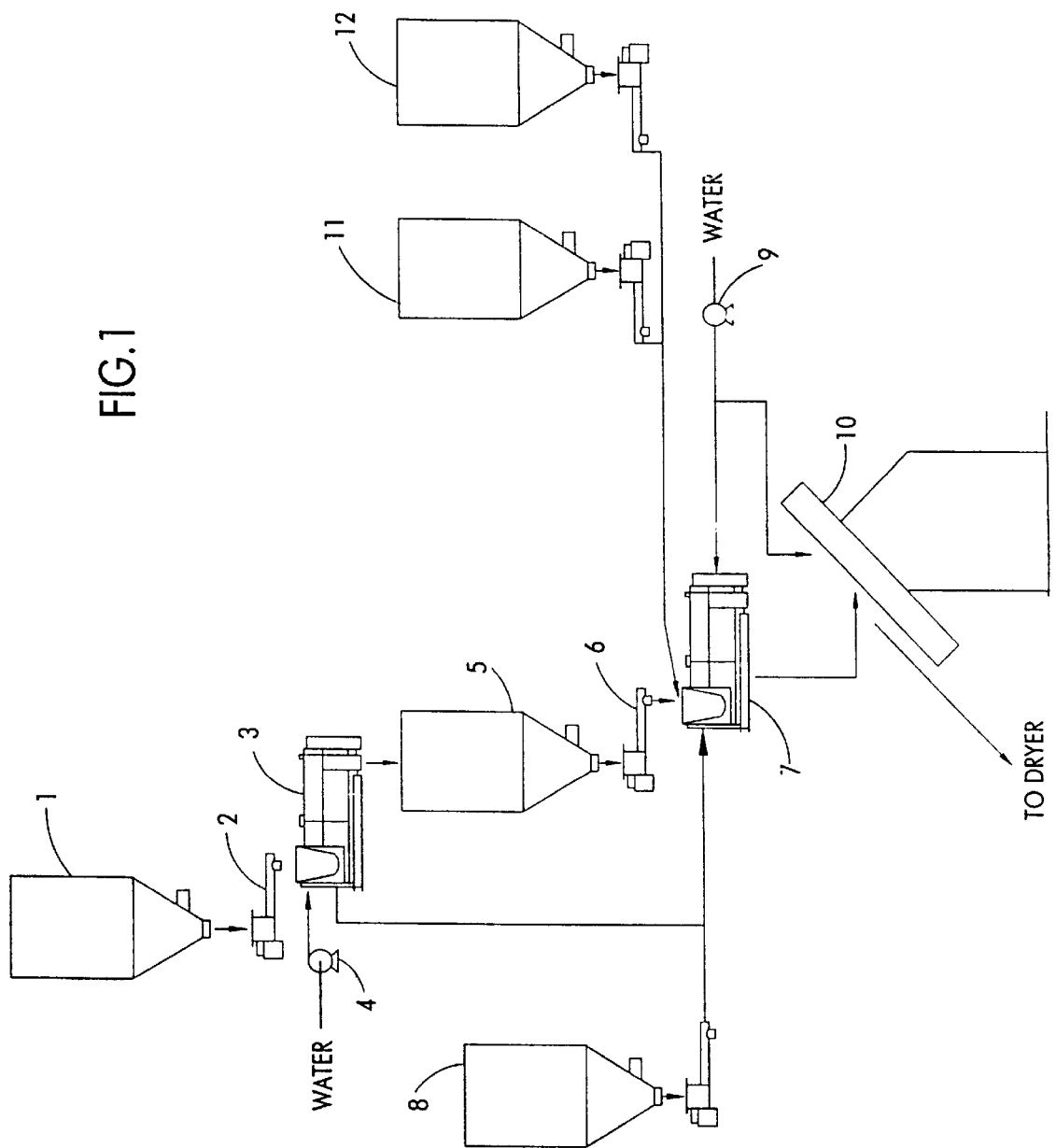
FIG. 1 is a flow diagram of one embodiment of the process of the present invention.

In accordance with the present invention, mechanically-strong, water-disintegrable agglomerates produced from cement kiln dust are provided. The agglomerates are useful as a soil conditioner to neutralize soil acidity and provide a source of nutrient values. A process for forming the agglomerates is also provided. As used herein, agglomerate means pellets and irregularly-shaped particles formed by the consolidation of smaller particles. All mesh sizes herein are in reference to the Tyler Standard Sieve Series.

The composition of cement kiln dust can vary significantly with the composition of the raw materials fed to the kiln, the kiln system, the fuel used to fire the kiln as well as the conditions encountered by the dust particles in the kiln and in the dust collection apparatus. Generally, cement kiln dust is comprised of varying amounts of elements such as Ca, Mg, Si, Al and Fe, trace amounts of heavy metals and a distribution of alkalies such as K, Na and Li. Most of these elements are present as carbonates, sulfates, halides, hydroxides or oxides. Since the kiln dust has undergone some degree of calcination, the $CaCO_3$ content in the dust is depleted relative to the kiln feed and a significant portion of the calcium is instead present as CaO. Due to its composition which includes CaO, raw cement kiln dust exiting the kiln is highly-reactive toward water and has the potential to hydrate and harden if exposed to sufficient moisture.

A representative cement kiln dust composition is set forth in Table 1 below. However, it should be understood that Table 1 is intended as merely exemplary and cement kiln dust need not include all of these constituents in the concentrations listed below nor are other possible constituents excluded.

TABLE 1

| Constituent | % By Weight |
|---|---|
| $CaCO_3$ | 30–60 |
| CaO | 5–40 |
| $SiO_2$ | 10–20 |
| $Al_2O_3$ | 2–6 |
| $Fe_2O_3$ | 1–4 |
| MgO | 1–4 |
| $K_2SO_4$ | 3–9 |
| $CaSO_4$ | 2–8 |
| $Na_2SO_4$ | 1–3 |
| KCl | 1–3 |
| KF | 0.1–1 |
| Heavy Metals | trace |

The agglomerates of the present invention are made from a preagglomerate mixture containing a water-soluble binder and a calcium source comprising cement kiln dust. Suitable water-soluble binders for use in the present invention include lignosulfonates, lignosulfonate salts (e.g., calcium lignosulfonate, ammonium lignosulfonate), water-soluble fertilizer materials (e.g., potash, ammonium nitrate, urea, diammonium phosphate), synthetic or naturally occurring polymers (e.g., polyvinyl alcohol, polyacrylic acid salts, amylose, methylcellulose, hydroxyethylcellulose, carboxymethylcellulose, ethylhydroxyethylcellulose, corn starch and wheat starch) and sugar-based binders such as molasses and those sold by RDE, Inc., Crystal Lake, Ill., 60014 under the "BREWEX" and "MOLTECH" trademarks, as well as mixtures of these various materials. An especially preferred binder is the calcium salt of lignosulfonate such as that sold by LignoTech USA, Greenwich, Conn. 06830 under the trademark "NORLIG A".

In addition to a calcium source and a water-soluble binder, the agglomerates may contain appreciable amounts of various particulate additives. For example, the agglomerates may further comprise a primary plant nutrient source (i.e., a source of nitrogen, phosphorous and/or potassium), a secondary plant nutrient source (i.e., a source of magnesium, sulfur, and/or calcium), and/or a micronutrient source (i.e., a source of iron, copper, boron, manganese, zinc and/or molybdenum). Upon disintegration of the agglomerate, these additives deliver their benefit to the soil along with the cement kiln dust.

In general, the agglomerate contains at least about 15% by weight of a calcium source. The calcium source may consists essentially of cement kiln dust. Optionally, the calcium source may comprise cement kiln dust combined with a calcium-containing secondary plant nutrient source. Suitable secondary plant nutrient sources containing calcium have a relatively high calcium carbonate equivalent value and include conventional soil liming agents such as hydrated lime, limestone, dolomitic limestone, gypsum ($CaSO_4·2H_2O$), quicklime and mixtures thereof. For some applications, the agglomerate may contain only a calcium source and a water-soluble binder, whereas for other applications the combined percentage of cement kiln dust and any calcium-containing secondary plant nutrient source will be from about 15% to about 50% by weight of the agglomerate. When the agglomerate includes a calcium-containing secondary plant nutrient source in addition to cement kiln dust, it is preferred that the weight ratio of the other calcium sources to cement kiln dust not exceed about 4:1 with ratios of about 2:1 to about 1:2, respectively, being more preferred, and that the supplemental calcium source have a calcium carbonate equivalent value in excess of 85%, more preferably in excess of about 90%, and most preferably in excess of about 92.5%.

For some applications, it will be preferred that the agglomerate contain appreciable quantities of a primary plant nutrient source of the type typically used in N-P-K fertilizer formulations. For example, the agglomerate may contain conventional sources of nitrogen, phosphorous and potassium such as ammonium nitrate, ammonium sulfate, alkali metal nitrates, urea, rock phosphate, mono and diammonium phosphate, bone meal slag, aluminum phosphate, superphosphate, potash, and potassium salts (e.g., chlorides, sulfates and nitrates). The agglomerate may also contain organic fertilizer ingredients such as manure and residues from sewage treatment plants. For such applications, it is preferred that the agglomerate contain about 20 to about 40% available nitrogen, preferably about 28% available nitrogen, about 10 to about 50% available phosphoric acid, and/or about 10 to about 50% available potash. If urea, potash or other N-P-K fertilizer ingredient is used as a binder, this also has the further beneficial effect of increasing the primary plant nutrient content of the agglomerate. Furthermore, if desired, the agglomerates may additionally include a micronutrient source.

A preferred agglomerate for use as a nitrogen source contains about 40% to about 80%, more preferably about 55% to about 60% by weight, urea or other source of available nitrogen (e.g., ammonium nitrate) and at least about 15% to about 60%, more preferably about 35% to about 45% by weight of a calcium source, based upon the weight of the agglomerate. In accordance with another preferred embodiment, an agglomerate for use as a potassium source contains about 30% to about 80%, more preferably about 45% to about 55% by weight, potassium chloride, potash or other source of potassium salts and at least about 15% to about 60%, more preferably about 45% to about 50% by weight of a calcium source, based upon the weight of the agglomerate. In these formulations, the N-P-K fertilizer ingredients function as a binder for the agglomerate as well as a nutrient source. To improve the mechanical strength, these preferred agglomerates may further comprise an additional binder such as one of the lignosulfonate binders disclosed herein.

Preferably, the cement kiln dust and any calcium-containing secondary plant nutrient source (e.g., limestone) used to prepare the agglomerate are finely divided. More specifically, it is preferred that the cement kiln dust and any supplemental calcium sources comprise a mixture of particles having a size distribution of which less than about 1% by weight is +20 mesh and less than about 10% by weight is −20 +100 mesh. More preferably, less than about 20% by weight of the particles in the mixture is −100 +150 mesh. Still more preferably, at least about 50% by weight of the particles in the mixture are −200 mesh. In a still more preferred embodiment, at least about 75% by weight of the particles in the mixture are −200 mesh and at least about 5%, at least about 25%, or even at least about 50% by weight are −300 mesh. In accordance with an especially preferred embodiment of the present invention, essentially all (e.g., at least about 95% by weight) of the particles of cement kiln dust and any supplemental calcium sources used to prepare the agglomerate are −100 mesh, preferably −150 mesh, more preferably −250 mesh and optimally −325 mesh. By using finely divided calcium-containing particles in the agglomerate, conversion of the calcium to plant-usable form (i.e., ionic calcium) once the agglomerate is incorporated into soil is expedited and optimum calcium saturation of the treated soil may be more readily attained.

Collected cement kiln dust exhibits a wide range of particle sizes, depending on a variety of factors including the type and extent of grinding of the raw materials, the type of kiln and the dust collection apparatus employed. Cement kiln dust may have a suitable particle size distribution as it is collected from the kiln. However, in other instances it may be necessary to reduce the particle size of the dust by ballmilling or other suitable means in order to obtain the desired particle size distribution.

In order to provide agglomerates exhibiting a relatively uniform composition throughout and avoid segregation of the individual components in the agglomerates, it is preferred that all of the materials incorporated therein be similarly sized. However, the particles of the various additives which may be present in the agglomerates may be somewhat larger than the particles of the calcium source. Thus, for example, it is preferred that the mixture of all the various materials incorporated into the agglomerates have a particle size distribution of which less than about 1% by weight is +20 mesh and less than about 15% by weight is −20 +100 mesh. More preferably, not more than about 25% by weight of these particles is −100 +150 mesh. Still more preferably, at least about 20% by weight of the particles in the mixture are −200 mesh. In a still more preferred embodiment, at least about 50% by weight of the particles in the mixture are −200 mesh and at least about 5%, at least about 25%, or even at least about 50% are −300 mesh. As with the calcium source, it may be necessary to reduce the particle size of the primary nutrient source and other additives by ballmilling or other suitable means in order to obtain the desired particle size distribution.

The agglomerates of the present invention are prepared from a preagglomerate mixture which comprises cement kiln dust, binder and optionally, the other ingredients previously mentioned. In order to achieve the mechanical strength and disintegration characteristics desired in the agglomerate, the amount of water-soluble binder present in the preagglomerate is generally at least about 1% by weight (dry basis). Use of larger quantities of binder generally yields higher strength agglomerates which may be desirable in some applications. Preferably, the amount of binder present in the preagglomerate is at least about 2%, more preferably, at least about 4% by weight (dry basis). Preferably, the amount of binder present in the preagglomerate is between about 4% and about 25% by weight (dry basis).

The water-soluble binder may be combined with the other components of the preagglomerate either as a solid or as an aqueous solution of the binder. If an aqueous solution of a lignosulfonate salt is employed, the solution suitably contains from about 48% to about 60% by weight solids. If a solid binder is used, it is preferred that a portion of the water necessary for agglomeration of the preagglomerate (e.g., approximately two-thirds) be added along with the binder to promote thorough mixing of the binder with the other components of the preagglomerate. It is preferred that substantially each particle of the preagglomerate be coated with binder. This ensures uniformity in both the preagglomerate and in the final product and may be achieved by using a high energy pin, auger, paddle or ribbon type mixer capable of intimately mixing the components of the preagglomerate.

As noted previously, cement kiln dust typically contains appreciable quantities of CaO and may further contain other calcium-containing compounds having the potential to react with water and form a solid hydrate, such as calcium sulfate ($CaSO_4$) and calcium sulfite ($CaSO_3$), which may be present in anhydrous or partially-hydrated forms. Other compounds such as MgO and $Na_2SO_4$ will also hydrate, but are typically present in relatively small proportions. When cement kiln dust is contacted with water, CaO and other calcium-containing compounds present in the cement kiln dust having hydration potential react with the water and are hydrated. In the case of CaO, the reaction product is hydrated or slaked lime, whereas calcium sulfate reacts with water to form gypsum. The reaction of these components with water is accompanied by a volumetric expansion or enlargement as they are converted to their hydrate form. The hydration of CaO to hydrated lime is believed to be accompanied by a particularly significant volumetric expansion. That is, it is believed that the potential of the cement kiln dust, and ultimately that of the preagglomerate, to hydrate and expand is predominantly attributable to the presence of CaO.

In the practice of the present invention, the preagglomerate mixture comprising the various components of the product is agglomerated using conventional tumble or growth agglomeration methods which include contacting the mixture with water in a suitable agglomeration device. The volumetric expansion which accompanies the hydration of Cao and other calcium-containing compounds having the potential to be hydrated present in the preagglomerate may tend to reduce the mechanical strength of the agglomerates if the concentration of these compounds in the preagglomerate is excessive. In general, it has been discovered that if the combined concentration of CaO and other calcium-containing compounds having the potential to be hydrated in the preagglomerate exceeds about 10% by weight (dry basis), the subsequent volumetric expansion of these components can significantly reduce the mechanical strength of the agglomerates. Therefore, the combined concentration of CaO and other calcium-containing compounds having the potential to be hydrated in the preagglomerate mixture is preferably no greater than about 10%, more preferably no greater than about 7%, still more preferably no greater than about 5% and optimally no greater than about 3% by weight on a dry basis.

The concentration of CaO and other calcium-containing compounds having the potential to be hydrated in the preagglomerate mixture may be controlled simply by limiting the amount of cement kiln dust and other sources of these compounds introduced into the preagglomerate. For example, for cement kiln dust containing about 30% by weight CaO, the amount of cement kiln dust introduced into the preagglomerate preferably does not exceed about 33% by weight, more preferably does not exceed about 23% by weight, still more preferably does not exceed about 17% by weight and optimally does not exceed about 10% by weight of the preagglomerate mixture. Limiting the proportion of cement kiln dust in the preagglomerate advantageously minimizes the extent to which the resulting agglomerate will swell upon hydration and thereby undermine the mechanical strength of the agglomerate. In addition, limiting the proportion of cement kiln dust in the preagglomerate permits the use of cement kiln dust containing relatively high concentrations of heavy metals (e.g., mercury, lead, arsenic etc.) or other potentially harmful components; that is, the balance of ingredients in the preagglomerate serve as a buffer to reduce the concentration of these components in the agglomerates so as to produce a suitable liming product that conforms with environmental guidelines.

Alternatively, the concentration of CaO and other calcium-containing compounds having the potential to be hydrated in the preagglomerate mixture is controlled by prehydrating all or a portion of the components of the preagglomerate mixture containing such compounds (e.g., cement kiln dust). Upon contacting cement kiln dust with water, CaO, $CaSO_4$, $CaSO_3$ and other components of the dust having hydration potential react with the water and are hydrated, thereby reducing the hydration potential of the cement kiln dust and ultimately of the preagglomerate. Preferably, the cement kiln dust is combined with an amount of water less than the stoichiometric amount necessary to totally hydrate the components of the dust in order to ease subsequent handling of the hydrated material in the agglomeration process. As the amount of water combined with the cement kiln dust approaches or exceeds the stoichiometric amount needed to totally hydrate the dust to be used in the preagglomerate, it becomes increasingly difficult to form acceptable agglomerates because the hydrated material begins to cement together into progressively larger particles which ultimately produce agglomerates that do not readily disintegrate when exposed to water. By combining the cement kiln dust with an amount of water less than the stoichiometric amount necessary to totally hydrate the components of the dust, the partially-hydrated dust remains substantially dry and free-flowing and can be easily combined with the other components of the preagglomerate.

As noted previously, the composition of cement kiln dust as well as the preagglomerate mixture can vary substantially. One way of approximating the concentration of CaO and other calcium-containing compounds having the potential to be hydrated in cement kiln dust and other materials in the preagglomerate mixture is to first dry the material to constant weight at about 100° to about 120° C. The dried material is then mixed with an amount of water in excess of the amount needed to totally hydrate the material (e.g., an equivalent weight of water) and dried again to constant weight at about 100° to about 120° C. The concentration of CaO and other calcium-containing compounds having the potential to be hydrated in the material can then be approximated from the difference between the weight of water added and the weight of the material after the second drying. This differential represents the amount of water reacted with CaO and other calcium-containing compounds having the potential to be hydrated present in the material to form hydrates and can be used to approximate the concentration of such compounds in the material.

Alternatively, in the absence of a compositional analysis of the cement kiln dust, a series of agglomeration trials may be used to determine whether the concentration of CaO and other calcium-containing compounds having the potential to be hydrated in the preagglomerate mixture needs to be reduced, either by limiting the amount of cement kiln dust introduced into the preagglomerate or by prehydrating all or some of the cement kiln dust and, if prehydration is employed, the amount of water required to adequately prehydrate the material. It has been found that the amount of water necessary to achieve the proper extent of partial-hydration of the cement kiln dust is usually between about 3% and about 16% by weight, and more typically between about 4% and about 8% by weight based on the starting weight of cement kiln dust. In order to ensure greater consistency in the composition of the cement kiln dust, the dust is preferably taken directly from the dust collection apparatus and fed to the instant process.

If prehydration of the cement kiln dust is employed, it is preferred that substantially each particle of dust be uniformly coated with water to assure greater compositional uniformity in the prehydrated material. This may be achieved by using a high energy pin, auger, paddle or ribbon type mixer capable of intimately mixing the dust and water.

In order to enhance the degree of contact between the cement kiln dust and the water and provide other beneficial effects, it is preferred to reduce the particle size of the dust, if necessary, by ballmilling or other suitable means to achieve a particle size distribution as described hereinabove. After the dust and water have been thoroughly mixed, the moistened dust is preferably conditioned by storing the dust for a time sufficient so that substantially all of the water is reacted with the dust. The moistened dust discharged from the mixer may be stored in a conditioning bin wherein the hydration reaction between the water and the dust is completed. In general, storage periods (i.e., conditioning times) from about 1 hour to as much as 24 hours are preferred. The hydration reaction which occurs upon combining the cement kiln dust and water is highly exothermic and its progress is easily monitored as the moistened dust is conditioned by measuring the temperature rise of the dust as it reacts with the water. After conditioning, the partially-hydrated dust is substantially dry. Again, since the composition of the cement kiln dust may vary considerably, it may be desirable to conduct a series of trials with a particular material varying the storage time in order to ensure the prehydration of the cement kiln dust is accomplished as desired.

A preagglomerate is produced by combining the cement kiln dust (some or all of which may be prehydrated) and a water-soluble binder along with any other materials to be included in the agglomerate in proportions sufficient to provide an agglomerate of the desired composition. The preagglomerate may contain a portion of the water required for pelletizing. The preagglomerate is fed to a suitable agglomeration device and pelletized to form the agglomerates. Once the agglomerates are formed, the binder and cement kiln dust particles form a matrix comprising the binder disposed within interstices between dust particles which binds the agglomerates together.

Although in the preceding description the prehydration of the cement kiln dust and addition of the binder were described as two distinct steps, it should be understood that prehydration of the dust and addition of the binder could take place simultaneously in a single step. For example, the binder may be added to the raw cement kiln dust as an aqueous solution of the binder, the binder solution containing sufficient water to achieve the appropriate degree of hydration of the dust. In such an operation, the raw dust and binder solution could be combined in a high energy mixture and then conditioned for a time sufficient to allow substantially all of the water to react with the dust. A portion of the water necessary for pelletizing could then be added to the conditioned dust containing the binder along with any additives to form the preagglomerate. Similarly, raw cement kiln dust, a solid water-soluble binder and an appropriate amount of water could be mixed intimately in a high energy mixture, conditioned and mixed with additional water and any additives to form a suitable preagglomerate.

The moistened material of the preagglomerate is fed directly into any suitable pelletizing apparatus as is known in the art. Suitable pelletizing devices include drum, tub and shallow pan disc pelletizers or any other suitable tumble or growth agglomeration device. Preferably, a shallow-pan disc pelletizer is employed as the agglomeration device. Once the degree of tilt and rotational speed of the pan are determined, pelletizing of the moistened preagglomerate proceeds as is well known to those skilled in the art. In addition to these variables, more water is typically added in the pan to optimize the size and consistency of the agglomerates produced on the shallow pan disc pelletizer. The various parameters of the pelletizing step are controlled as is known in the art so as to produce agglomerates having a size suitable for broadcast or row placement using conventional fertilizer application equipment. Typically the agglomerates should be −3 +40 mesh, more preferably −6 +16 mesh.

After the agglomerates are discharged from the pelletizer, they are dried to remove a large portion of the internal water which is initially present in the newly-formed agglomerates. Active drying of the agglomerates is preferred to obtain a product having the desired mechanical strength and disintegration characteristics. If the agglomerates are not actively dried by heating, the water present in the freshly pelletized agglomerates may continue to react with the remaining components of the cement kiln dust which can still be hydrated and eventually form very hard, substantially non-disintegrable agglomerates resembling concrete. Preferably, the newly formed agglomerates are dried to reduce their moisture content to less than about 1% by weight, more preferably to less than about 0.5% by weight.

The agglomerates may be dried in any suitable apparatus. For example, drying may take place in an oven maintained at a temperature from about 100° to about 140° C. or a vibrating fluidized bed dryer or rotary dryer may be employed. In a continuous process, vibrating fluidized bed or rotary dryers are preferred since migration of the binder towards the exterior of the agglomerate is reduced, providing a more uniform product exhibiting improved mechanical strength. If a vibrating fluidized bed dryer is used, the dryer is suitably operated with a drying air entrance temperature of about 315° C. and an exit air temperature of about 95° C. However, these temperatures may vary significantly with the residence time of the agglomerates in the dryer. Preferably, the agglomerates do not exit the dryer at a temperature in excess of about 65° C. Depending upon the additives incorporated into the agglomerate, the drying temperatures noted hereinabove may have to be decreased in order to avoid melting the agglomerate.

Once dried, the agglomerates should have sufficient mechanical strength to withstand normal handling, transportation and blending without fracturing and without excessive sloughing to form dust. There are several standardized methods that may be used for measuring mechanical strength of granular materials. However, a simple and widely-accepted standard is crush strength. Crush strength is measured by determining the minimum mass which crushes an agglomerate of particular size when the mass is placed on the agglomerate. In the practice of the present invention, the drying and removal of water from the newly-formed agglomerates is controlled such that dried agglomerates having a size ranging from −7 to +8 mesh exhibit an average green crush strength of at least about 2 pounds (about 0.9 kg), preferably at least about 4 pounds (about 1.8 kg), more preferably at least about 6 pounds (about 2.7 kg), still more preferably at least about 8 pounds (about 3.6 kg) and optimally at least about 9 pounds (about 4.1 kg). By green crush strength it is meant the crush strength of the dried agglomerates immediately after drying. In our experience, we have found that the newly dried agglomerates continue to increase in hardness as they age. This may be due to residual moisture present in the dried agglomerates which continues to react with and hydrate components of the cement kiln dust, resulting in further hardening of the agglomerate.

In certain states of the United States of America, liming agents such as the agglomerates of the present invention must comply with local ordinances which establish guidelines for the disintegration characteristics of such agents when exposed to water. Generally, liming agents should disintegrate once incorporated in the soil and exposed to water (e.g., rain) so that the various beneficial components of the agent can be utilized by the soil. In addition to substantial mechanical strength, the agglomerates made from cement kiln dust in accordance with the present invention disintegrate rapidly when immersed in water. Once exposed to water, the water-soluble binder in the agglomerate is readily dissolved, causing the agglomerate to disintegrate, leaving behind cement kiln dust particles of substantially the same size as the original dust, thereby allowing the agglomerates of the present invention to serve as a fertilizer or an effective liming agent. In a preferred embodiment, the agglomerates of the present invention will dissolve in less than 10 minutes, more preferably in less than 5 minutes, still more preferably in less than 3 minutes, still more preferably in less than 2 minutes, and optimally in less than 1 minute when immersed in water at or near room temperature.

A process flow diagram is presented in FIG. 1 illustrating an example of the type of equipment and flow scheme which may be used in practicing the present invention.

If prehydration of the cement kiln dust is employed, finely-divided cement kiln dust is loaded into bin 1 and discharged by feeder 2 at a predetermined rate into a high energy mixer 3 along with water from pump 4 fed to the mixer at a rate sufficient to achieve the desired degree of hydration. Suitable high energy mixing devices include the device shown in U.S. Pat. No. 4,881,887 (Holley) sold by Ferro-Tech, Inc., Wyandotte, Mich. 48192 under the trademark "FERRO-TECH-TURBULATOR". After sufficient residence time in mixer 3 to ensure intimate contact between the dust and the water, the hydrated mixture is discharged from mixer 3 into conditioning bin 5 and stored for a period of time sufficient to ensure that substantially all of the water has reacted with the dust.

After conditioning, hydrated cement kiln dust is then discharged at a predetermined rate from bin 5 by feeder 6 into a second high energy mixer 7 along with a water-soluble binder, either in a liquid or a solid form, fed to mixer 7 at a predetermined rate from storage bin 8. Alternatively, the water-soluble binder could be combined with the raw cement kiln dust in mixer 3.

If prehydration of the cement kiln dust is not employed, it should be understood that bin 1, feeder 2 high energy mixer 3 and pump 4 are omitted from the process shown in FIG. 1 and instead, raw cement kiln dust is loaded into bin 5.

Additional water for pelletizing from pump 9 may be added to mixer 7 as needed to form the preagglomerate. If a product comprising cement kiln dust and binder with no other additive is desired, then the preagglomerate issues from mixer 7 directly onto a suitable agitated agglomeration device 10 (e.g., a shallow pan disc pelletizer). Preferably, the preagglomerate is pelletized using a shallow pan disc pelletizer of the type shown in U.S. Pat. Nos. 4,726,755 (Holley) and 3,883,281 (Holley) sold by Ferro-Tech, Inc., Wyandotte, Mich. 48192 under the trademark "FERRO-TECH".

If primary plant nutrient source (e.g., potash, urea and other N-P-K fertilizer components), secondary plant nutrient source (e.g., limestone) and/or a micronutrient source additives described hereinabove are desired in the final agglomerates, these additives may be fed from bins 11 and 12 directly into mixer 7 along with the raw or hydrated cement kiln dust from feeder 6, binder from storage bin 8 and additional water from pump 9 to form a suitable preagglomerate which is then fed to agglomeration device 10.

Agglomerates of the desired size discharged from the agglomeration device may then be fed directly into a suitable drying device (not shown) for drying.

The present invention is illustrated by the following examples which are merely for the purpose of illustration and are not to be regarded as limiting the scope of the invention or manner in which it may be practiced. In the proceeding examples, reference to weight percentages are based on the starting weight of cement kiln dust unless otherwise stated.

EXAMPLE 1

In this example, agglomerates were made from preagglomerate mixtures containing varying amounts of CaO combined with $CaCO_3$, urea and/or potash fines along with an aqueous solution of NORLIG A brand calcium lignosulfonate (about 54 weight percent lignosulfonate salt) as a binder. The preagglomerates were formed by thoroughly mixing CaO with measured quantities of $CaCO_3$, urea and/or potash fines. The CaO, $CaCO_3$, urea and potash fines each exhibited a particle size of −100 mesh. Once formed, the preagglomerate was then hand fed to a shallow pan disc pelletizer and formed into agglomerates. In some trials, the aqueous solution of lignosulfonate binder was mixed with the other components of the preagglomerate before being introduced onto the pan, while in other trials the binder was added to the other materials after they were introduced onto the pan. Whether the binder was added to the preagglomerate before or after being introduced onto the pan did not appear to affect the agglomeration process. During pelletizing, approximately 5 to 8 weight percent of additional water (based on the weight of the preagglomerate including the lignosulfonate binder) was sprayed onto the agglomerates as they formed in the pan. The agglomerates were removed from the pan by hand and dried in an oven at 60–85° C. for approximately 30 minutes. After drying, the resulting agglomerates were screened to produce agglomerates having a size ranging from approximately −6 to +16 mesh. If possible, the green crush strength of the dried, screened agglomerates was determined. Set forth in Table 2 below is the composition of the preagglomerates and the observed results.

TABLE 2

| Preagglomerate Composition (wt %) | | | | | Results |
|---|---|---|---|---|---|
| CaO | Potash | $CaCO_3$ | Urea | Binder | Crush Strength (lb) |
| 95 | — | — | — | 5 | fell apart |
| 50 | — | 45 | — | 5 | fell apart |
| 25 | — | 70 | — | 5 | fell apart |
| 10 | — | 85 | — | 5 | fell apart |
| 7 | — | 88 | — | 5 | 4.3 |
| 5 | — | 90 | — | 5 | 6.4 |
| 3 | — | 92 | — | 5 | 9.0 |
| 5 | — | 88 | — | 7 | 7.0 |
| 7 | — | 86 | — | 7 | 4.2 |
| 10 | — | 81 | — | 9 | ~2 |
| 50 | — | — | 45 | 5 | fell apart |
| 25 | — | — | 70 | 5 | fell apart |
| 10 | — | — | 85 | 5 | 3.0 |
| 7 | — | — | 88 | 5 | 5.8 |
| 5 | — | — | 90 | 5 | 8.2 |
| 3 | — | — | 92 | 5 | 9.6 |
| 10 | — | — | 83 | 7 | 6.0 |
| 7 | — | — | 86 | 7 | 7.1 |
| 5 | — | — | 88 | 7 | 8.1 |
| 50 | 45 | — | — | 5 | fell apart |

TABLE 2-continued

| Preagglomerate Composition (wt %) | | | | | Results |
|---|---|---|---|---|---|
| CaO | Potash | CaCO₃ | Urea | Binder | Crush Strength (lb) |
| 25 | 70 | — | — | 5 | fell apart |
| 10 | 85 | — | — | 5 | 3.2 |
| 7 | 88 | — | — | 5 | 5.9 |
| 5 | 90 | — | — | 5 | 8.0 |
| 3 | 92 | — | — | 5 | 9.2 |
| 10 | 83 | — | — | 7 | 5.3 |
| 7 | 86 | — | — | 7 | 6.9 |
| 5 | 88 | — | — | 7 | 8.0 |
| 50 | 22.5 | — | 22.5 | 5 | fell apart |
| 25 | 35 | — | 35 | 5 | fell apart |
| 10 | 42.5 | — | 42.5 | 5 | 3.2 |
| 7 | 44 | — | 44 | 5 | 6.0 |
| 5 | 45 | — | 45 | 5 | 7.9 |
| 3 | 46 | — | 46 | 5 | 8.4 |

EXAMPLE 2

Three samples of cement kiln dust taken directly from the dust collection apparatus of a portland cement plant (Plant A) were hydrated using varying amounts of water. The three samples were combined in a high energy mixer with 10, 14 and 16 weight percent water, respectively and stored in sealed containers for approximately 24 hours. Each sample of hydrated material was then mixed with 7 weight percent potash, 5 weight percent of an aqueous solution of NORLIG A brand calcium lignosulfonate (about 54 weight percent lignosulfonate salt) and additional water in a high energy mixer to form a preagglomerate. The preagglomerate was then fed to a FERRO-TECH brand shallow pan disc pelletizer and formed into agglomerates. During pelletizing, approximately 5 weight percent of additional water was added to the forming agglomerates. The agglomerates had a size ranging from approximately −6 to +16 mesh. These agglomerates were then oven dried at 120° C. for approximately 24 hours. The dried agglomerates from all three runs exhibited a green crush strength of approximately 3 pounds (about 1.4 kg) and disintegrated in a matter of minutes when immersed in water.

EXAMPLE 3

Four samples of cement kiln dust were taken directly from the dust collection apparatus of each of two other portland cement plants (Plants C and L) and hydrated using varying amounts of water. The four samples from each plant were combined in a high energy mixture with 4, 6, 8 and 10 weight percent water, respectively, and stored in sealed containers for approximately 24 hours. Each of the samples of hydrated material was then mixed with 8 weight percent of an aqueous solution of NORLIG A brand calcium lignosulfonate (about 54 weight percent lignosulfonate salt) and additional water in a high energy mixer to produce a preagglomerate. The preagglomerate was then fed to a FERRO-TECH brand shallow pan disc pelletizer and formed into agglomerates. During pelletizing, approximately 2.5 to 5 weight percent of additional water was added to the forming agglomerates. The agglomerates had a size ranging from approximately −6 to +16 mesh. These agglomerates were then oven dried at 120° C. for approximately 24 hours. The dried agglomerates from all eight runs exhibited a green crush strength of approximately 1 to 3 pounds (about 0.5 to 1.4 kg). The crush strength was found to increase as the amount of water used to partially hydrate the dust was increased. However, the agglomerates made from the dust hydrated with 4 weight percent water disintegrated in 1 to 2 minutes when immersed in water, while the agglomerates made from the dust hydrated with 10 weight percent water disintegrated in 10 to 20 minutes. The disintegration rate of agglomerates made from the dust samples hydrated with 6 and 8 weight percent water fell between these two values.

EXAMPLE 4

Four samples of cement kiln dust taken directly from the dust collection apparatus of Plant C were processed exactly as described in Example 3 except that (1) in addition to the aqueous solution of NORLIG A brand calcium lignosulfonate, 8 weight percent of potash was added to the hydrated material; and (2) instead of approximately 2.5 to 5 weight percent, approximately 10 weight percent of additional water was added to the forming agglomerates during pelletizing. Similar results to those in Example 3 were achieved. The dried agglomerates from all four runs exhibited a green crush strength of approximately 1 to 3 pounds (about 0.5 to 1.4 kg) which tended to increase as the amount of water used to partially hydrate the dust was increased. Similarly, the disintegration rate of the agglomerates decreased as the amount of water used to partially hydrate the dust was increased.

The data from Example 3 and the present example demonstrate the effect of varying the amount of water used to hydrate the dust on the rate of disintegration of the final agglomerate. Thus, by varying the amount of water used to hydrate a particular dust, the disintegration characteristics of the agglomerate may be altered as desired. Thus, in Example 3 and the present example, if a high rate of disintegration is desired, then the agglomerates made using 4 weight percent water would be preferred.

The agglomerates made in the present example were subjected to a wet sieving test to better examine the disintegration characteristics of these pellets. The wet sieving test was conducted by stacking five sieves of differing mesh size such that the sieve opening decreased progressively from the top sieve to the bottom sieve. After weighing, a sample of the agglomerates made in the present example was immersed in water for approximately 48 hours. The moistened material was then deposited on the top sieve and subjected to a gentle spray of wash water. As the material disintegrated, it passed through the top sieve along with the wash water and was deposited onto the next sieve. Wash water was applied to the top sieve until the water draining through the sieve was substantially clear. The top sieve was then removed and the washing process repeated on each subsequent sieve in the stack in the same fashion as described above. Each of the sieves and any material remaining on the screens were heated to remove substantially all the moisture and then weighed. The weight of material (dry) which did not pass through each sieve was determined by subtracting the tare weight of each sieve. Summarized in Table 2 below is the weight percentage of material (based on the starting weight of the sample of agglomerates) which did not pass through each of the five sieves in the wet screening test.

TABLE 2

| Sieve | Tyler Standard Sieve Series | Weight % Not Passing |
|---|---|---|
| Top | 9 | 0 |
| Second | 20 | 0 |
| Third | 32 | 0 |
| Fourth | 60 | 0.8 |
| Bottom | 100 | 7.0 |

As noted in Table 2, the agglomerates subjected to the wet screening test disintegrated such that all of the resulting particulate matter had a nominal diameter less than 500 $\mu$m (i.e., −32 mesh) and substantially all of the resulting particles had a nominal diameter less than 150 $\mu$m (i.e., −100 mesh).

EXAMPLE 5

A sample of cement kiln dust taken directly from the dust collection apparatus of Plant A was processed exactly as described in Example 2 using 10 weight percent water to hydrate the dust and using only potash (7 weight percent) as the binder. After oven drying, the resulting agglomerates having a size ranging from approximately −6 to +16 mesh exhibited a green crush strength of approximately 3 pounds (about 1.4 kg) and disintegrated in a matter of minutes when immersed in water.

EXAMPLE 6

A sample of cement kiln dust taken directly from the dust collection apparatus of Plant A was processed exactly as described in Example 2 using 14 weight percent water to hydrate the dust and using only 7 weight percent of an aqueous solution of NORLIG A brand calcium lignosulfonate (about 54 weight percent lignosulfonate salt) as the binder. A slightly larger amount of the lignosulfonate salt solution was used than in Example 2 to compensate for the loss of binding action due to the absence of potash. After oven drying, the resulting agglomerates having a size ranging from approximately −6 to +16 mesh exhibited a green crush strength ranging from approximately 2 to 3 pounds (about 1 to 1.4 kg) and disintegrated in a matter of minutes when immersed in water.

EXAMPLE 7

A sample of cement kiln dust taken directly from the dust collection apparatus of Plant A was processed exactly as described in Example 2 except that the dust was not hydrated before adding the binder. After oven drying, the resulting agglomerates having a size ranging from approximately −6 to +16 mesh exhibited essentially no crush strength, falling apart by simple vibration or touch of the hand.

This example demonstrates the importance of controlling the concentration of CaO and other calcium-containing compounds having the potential to be hydrated in the preagglomerate. Unless the cement kiln dust is sufficiently hydrated before pelletizing or combined with materials in the preagglomerate to sufficiently dilute the hydration potential, the components of the preagglomerate will tend to hydrate excessively during formation of the agglomerate. Such hydration is accompanied by a volumetric expansion of the formed agglomerate which renders the agglomerate weak and undesirable for agricultural uses.

EXAMPLE 8

A sample of cement kiln dust taken directly from the dust collection apparatus of Plant C was combined in a high energy mixture with 14 weight percent water using a residence time of approximately 1 hour. The hydrated material was then mixed with both 7 weight percent potash and 5 weight percent of an aqueous solution of NORLIG A brand calcium lignosulfonate (about 54 weight percent lignosulfonate salt) in a high energy mixer to form a preagglomerate. The preagglomerate was then fed to a FERRO-TECH brand shallow pan disc pelletizer to form agglomerates. During pelletizing, approximately 2.5 weight percent of additional water was added to the forming agglomerates. The agglomerates formed had a size ranging from approximately −6 to +16 mesh. These agglomerates were then oven dried at 120° C. for approximately 24 hours. The dried agglomerates exhibited a green crush strength of from approximately 1 to 2 pounds (about 0.5 to 0.9 kg) and disintegrated in 10 to 20 minutes when immersed in water.

It is believed that the somewhat lower crush strength of the agglomerates produced in this example as compared to Example 2 is a result of the cement kiln dust containing lower concentrations of Cao and other components which hydrate upon exposure to water as compared to the dust used in Example 2. Therefore, the amount of hydration water should be reduced.

EXAMPLE 9

A sample of cement kiln dust from Plant C was removed from an outdoor disposal site where it had been exposed to atmospheric moisture and rain and was presumably completely hydrated. This sample was formed into agglomerates without further hydration and without using a binder. During pelletizing, approximately 5 weight percent of additional water was added to the forming agglomerates. The agglomerates formed had a size ranging from approximately −6 to +16 mesh. These agglomerates were then oven dried at 120° C. for approximately 24 hours. The dried agglomerates exhibited a green crush strength of approximately 6 pounds (about 2.7 kg) but did not disintegrate after several months of immersion in water and, thus, would not be suitable for agricultural uses.

This example demonstrates the importance of adding a water-soluble binder in producing an agglomerate having desirable disintegration characteristics.

EXAMPLE 10

A 2.3 kg sample of cement kiln dust taken directly from the dust collection apparatus of Plant C was ballmilled to a bulk density of about 863 kg/m$^3$. The ballmilled dust was hydrated by combining it with 8 weight percent (0.18 kg) water in a high energy mixer. After two minutes of mixing, the material was removed from the mixer and transferred into a sealed container. In order to simulate bin storage of a large quantity of hydrating cement kiln dust, the sealed container was placed in an oven maintained at about 65° C. for a period of about 24 hours. Approximately 1 kg of the hydrated dust was then mixed with about 1 kg of ballmilled urea and approximately 0.16 kg of an aqueous solution of NORLIG A brand calcium lignosulfonate (about 54 weight percent lignosulfonate salt) in a high energy mixer for approximately 18 seconds. This mixture was then fed to a FERRO-TECH brand shallow pan disc pelletizer and formed into agglomerates. Approximately 7.5 weight percent of water (based on combined weight of hydrated dust and urea) was added to the mixture in the form of solvent in the aqueous binder solution and as pelletizing water in the pan. The formed agglomerates were removed from the pan, allowed to stand at room temperature for about 24 hours and dried in a portable fluidized bed dryer at 38° to 50° C. for approximately 15 minutes. The dried agglomerates were sieved screened to a size ranging from −6 to +16 mesh. Agglomerates ranging in size from −7 to +8 mesh exhibited a green crush strength of about 8 pounds (about 3.6 kg) and a bulk density of about 855 kg/m$^3$.

The dried agglomerates were analyzed for both total calcium and total nitrogen content using comprehensive analysis methods. Total calcium content was determined by digesting a sample of pulverized agglomerates in HCl over heat, diluting the resulting solution and subjecting it to atomic absorption analysis. Total nitrogen content was determined in accordance with Association of Official Analytical Chemist (AOAC) Method No. 2.059. The agglomerates contained 14.85 weight percent calcium and 19.40 weight percent nitrogen. For purposes of comparative liming capacity, the Ca content of the agglomerates in this example corresponds to 20.78 weight percent as CaO and 37.11 weight percent as $CaCO_3$.

EXAMPLE 11

A 2.3 kg sample of cement kiln dust taken directly from the dust collection apparatus of Plant L was ballmilled to a bulk density of about 679 kg/m$^3$. The ballmilled dust was hydrated by combining it with 8 weight percent (0.18 kg) water in a high energy mixer. After two minutes of mixing, the material was removed from the mixer and transferred into a sealed container. In order to simulate bin storage of a large quantity of hydrating cement kiln dust, the sealed container was placed in an oven maintained at about 65° C. for a period of about 24 hours. Approximately 1 kg of the hydrated dust was then mixed with about 1 kg of ballmilled urea and approximately 0.16 kg of an aqueous solution of NORLIG A brand calcium lignosulfonate (about 54 weight percent lignosulfonate salt) in a high energy mixer for approximately 18 seconds. This mixture was then fed to a FERRO-TECH brand shallow pan disc pelletizer and formed into agglomerates. Approximately 9.5 weight percent of water (based on combined weight of hydrated dust and urea) was added to the mixture in the form of solvent in the aqueous binder solution and as pelletizing water in the pan. The formed agglomerates were removed from the pan, allowed to stand at room temperature for about 24 hours and dried in a portable fluidized bed dryer at 38° to 50° C. for approximately 15 minutes. The dried agglomerates were sieved screened to a size ranging from −6 to +16 mesh. Agglomerates ranging in size from −7 to +8 mesh exhibited a green crush strength of about 8 pounds (about 3.6 kg) and a bulk density of about 714 kg/m$^3$.

The dried agglomerates were analyzed for both total calcium and total nitrogen content using the same methods as described in Example 10. The agglomerates contained 14.19 weight percent calcium and 19.50 weight percent nitrogen. For purposes of comparative liming capacity, the Ca content of the agglomerates in this example corresponds to 19.86 weight percent as CaO and 35.47 weight percent as $CaCO_3$.

EXAMPLE 12

A 2.3 kg sample of cement kiln dust taken directly from the dust collection apparatus of Plant C was ballmilled to a bulk density of about 863 kg/m$^3$. The ballmilled dust was hydrated by combining it with 8 weight percent (0.18 kg) water in a high energy mixer. After two minutes of mixing, the material was removed from the mixer and transferred into a sealed container. In order to simulate bin storage of a large quantity of hydrating cement kiln dust, the sealed container was placed in an oven maintained at about 65° C. for a period of about 24 hours. Approximately 1.5 kg of the hydrated dust was then mixed with about 0.5 kg of particulate dolomitic limestone, approximately 0.16 kg of an aqueous solution of NORLIG A brand calcium lignosulfonate (about 54 weight percent lignosulfonate salt) and 75 ml of water in a high energy mixer for approximately 18 seconds. This mixture was then fed to a FERRO-TECH brand shallow pan disc pelletizer and formed into agglomerates. Approximately 18 weight percent of water (based on combined weight of hydrated dust and dolomitic limestone) was added to the mixture in the form of solvent in the aqueous binder solution and as pelletizing water in the pan. After being removed from the pan, a sample of the agglomerates were dried immediately in a portable fluidized bed dryer at 38° to 50° C. for approximately 15 minutes, while the remainder of the agglomerates were allowed to first stand at room temperature for about 24 hours and then dried in the portable fluidized bed dryer. The dried agglomerates were sieved screened to a size ranging from −6 to +16 mesh. The agglomerates which were allowed to stand 24 hours and having a size ranging from −7 to +8 mesh exhibited a green crush strength of about 2.4 pounds (about 1.1 kg) and a bulk density of about 1057 kg/m$^3$, while similarly sized agglomerates which were dried immediately in the fluidized bed dryer exhibited green crush strengths between about 2 and about 3 pounds (between about 1 and about 1.4 kg). If desired, the green crush strength of the agglomerates could be increased by using a larger quantity of binder.

EXAMPLE 13

Urea (2.4 pounds), crushed limestone (0.8 pounds), and non-prehydrated cement kiln dust (0.8 pounds) were mixed with water (Test 13-1) or a binder (a solution of lignosulfonate having approximately 50% solids—Test 13-2) in a Model 12TB34 Batch Turbulator for 18 seconds to form preagglomerates. The preagglomerates were hand fed to a Model 024" 2'0" Disc Pelletizer in which water was being sprayed onto the disc at a 4:30/6:30 positions. The agglomerates were removed by hand and dried at 120° F. to produce screened dry pellets (−6 +16 mesh). The moisture content and bulk density of the starting materials are presented below in Table 3:

TABLE 3

| Raw Data | Moisture | Bulk Density |
| --- | --- | --- |
| Urea | N/A | 636 kg/m$_3$ |
| Limestone | 0% | 1330 kg/m$_3$ |
| Cement Kiln Dust | 0% | 867 kg/m$_3$ |

The resulting agglomerates were analyzed and found to have the following characteristics:

| TEST 13-1 | |
| --- | --- |
| Binder | (water only) |
| Amount of water at Batch Turbulator | 50 ml |
| Moisture from disc. | 7% |
| Product bulk density | 764 kg/m$^3$ |
| Crush Strength average (−6 +8 mesh) | 6 pounds (2.7 kg) |

-continued

TEST 13-2

| | |
|---|---|
| Binder | 3% Lignin |
| Amount of Water at Batch Turbulator | 50 ml |
| Moisture from Disc. | 7% |
| Product Bulk Density | 772 kg/m³ |
| Crush Strength Average (−6 +8 mesh) | 7 pounds (3.2 kg) |

EXAMPLE 14

The procedure of Example 13 was repeated except that urea (2.4 pounds) and cement kiln dust (1.6 pounds) were mixed with 50 ml water in the Batch Turbulator for 18 seconds. The results were as follows:

| | |
|---|---|
| Moisture from Disc | 7% |
| Product Bulk Density | 706 kg/m³ |
| Crush Strength Average (−6 +8 mesh) | 3 pounds (1.4 kg) |

In view of the above, it will be seen that the several objects of the invention are achieved.

As various changes could be made in the above-described invention without departing from the scope of the invention, it is intended that all matter contained in the above description be interpreted as illustrative and not in a limiting sense.

What is claimed is:

1. A process for forming an agglomerate containing cement kiln dust for use as a soil conditioning agent to neutralize soil acidity and provide a source of nutrient values, the process comprising:
   preparing a preagglomerate containing a water-soluble binder and a particulate calcium source comprising cement kiln dust, the preagglomerate containing at least about 2% by weight of the water-soluble binder, the combined concentration of CaO and other calcium-containing compounds having the potential to be hydrated in the preagglomerate being no greater than about 10% by weight;
   pelletizing the preagglomerate to form the agglomerate, the proportion of the particulate calcium source in the preagglomerate being sufficient such that the agglomerate contains at least about 15% by weight of the particulate calcium source; and
   drying the agglomerate, the drying being controlled such that dried agglomerates having a size ranging from −7 to +8 Tyler Standard Sieve Series exhibit an average green crush strength of at least about 2 pounds.

2. The process as set fort in claim 1 wherein the concentration of CaO and other calcium-containing compounds having the potential to be hydrated in the preagglomerate is not greater than about 7% by weight.

3. The process as set fort in claim 2 wherein the concentration of CaO and other calcium-containing compounds having the potential to be hydrated in the preagglomerate is not greater than about 5% by weight.

4. The process as set fort in claim 3 wherein the concentration of CaO and other calcium-containing compounds having the potential to be hydrated in the preagglomerate is not greater than about 3% by weight.

5. The process as set forth in claim 1 wherein the preagglomerate comprises at least about 4% by weight of the water-soluble binder.

6. The process as set forth in claim 1 wherein the water-soluble binder comprises one or more materials selected from the group consisting of lignosulfonates, lignosulfonate salts, potash, urea, ammonium nitrate, diammonium phosphate, polyvinyl alcohol, polyacrylic acid salts, amylose, methylcellulose, hydroxyethylcellulose, carboxymethylcellulose, ethylhydroxyethylcellulose, corn starch, wheat starch and sugar-based binders.

7. The process as set forth in claim 6 wherein the water-soluble binder comprises an aqueous solution of a lignosulfonate salt.

8. The process as set forth in claim 1 wherein the particulate calcium source consists essentially of cement kiln dust.

9. The process as set forth in claim 1 wherein the particulate calcium source comprises cement kiln dust combined with at least one other calcium-containing secondary plant nutrient source selected from the group consisting of hydrated lime, limestone, dolomitic limestone, gypsum, quicklime and mixtures thereof.

10. The process as set forth in claim 9 wherein the weight ratio of the calcium-containing secondary plant nutrient source to cement kiln in the particulate calcium source does not exceed about 4:1.

11. The process as set forth in claim 10 wherein the particulate calcium source has a particle size distribution such that at least about 95% by weight of the particulate calcium source is −100 mesh Tyler Standard Sieve Series.

12. The process as set forth in claim 10 wherein the preagglomerate further comprises a primary plant nutrient source selected from the group consisting of ammonium nitrate, ammonium sulfate, alkali metal nitrates, urea, rock phosphate, mono and diammonium phosphate, bone meal slag, aluminum phosphate, superphosphate, potash, potassium salts and mixtures thereof.

13. The process as set forth in claim 1 wherein at least a portion of the cement kiln dust in the preagglomerate is prehydrated by combining the cement kiln dust with an amount of water less than the stoichiometric amount necessary to totally hydrate the dust to produce partially-hydrated cement kiln dust.

14. The process as set forth in claim 13 wherein the preagglomerate is formed by first combining at least a portion of the cement kiln dust with an amount of water less than the stoichiometric amount necessary to totally hydrate the dust to produce partially-hydrated cement kiln dust and then combining the partially-hydrated cement kiln dust with the water-soluble binder.

15. The process as set forth in claim 13 wherein the reaction between the cement kiln dust and water to form the partially-hydrated cement kiln dust is carried out by intimately mixing the dust and the water and storing the mixture for a period of time sufficient so that substantially all of the water is reacted with the dust.

16. The process as set forth in claim 1 wherein the drying of the agglomerates is controlled such that dried agglomerates having a size ranging from −7 to +8 Tyler Standard Sieve Series exhibit an average green crush strength of at least about 4 pounds.

17. An agglomerate for use as a soil conditioner to neutralize soil acidity and provide a source of nutrient values, the agglomerate being formed by pelletizing a preagglomerate containing a water-soluble binder and a particulate calcium source comprising cement kiln dust combined with at least one other calcium-containing secondary plant nutrient source selected from the group consisting of hydrated lime, limestone, dolomitic limestone, gypsum, quicklime and mixtures thereof, the particulate calcium source having a particle size distribution such that less than about 1% by weight of the particulate calcium source is +20 mesh and less than about 10% by weight of the particulate calcium source is −20 +100 mesh Tyler Standard Sieve Series, the combined concentration of CaO and other calcium-containing compounds having the potential to be hydrated in the preagglomerate being no greater than about 10% by weight, the preagglomerate containing at least about 1% by weight of the water-soluble binder.

18. The agglomerate as set forth in claim 17 wherein the particulate calcium source has a particle size distribution such that less than about 20% by weight of the particulate calcium source is −100 +150 mesh Tyler Standard Sieve Series.

19. The agglomerate as set forth in claim 18 wherein the particulate calcium source has a particle size distribution such that at least about 50% by weight of the particulate calcium source is −200 mesh Tyler Standard Sieve Series.

20. The agglomerate as set forth in claim 19 wherein the particulate calcium source has a particle size distribution such that at least about 75% by weight of the particulate calcium source is −200 mesh and at least about 5% by weight of the particulate calcium source is −300 mesh Tyler Standard Sieve Series.

21. The agglomerate as set forth in claim 17 wherein the particulate calcium source has a particle size distribution such that at least about 95% by weight of the particulate calcium source is −100 mesh Tyler Standard Sieve Series.

22. The agglomerate as set forth in claim 21 wherein the particulate calcium source has a particle size distribution such that at least about 95% by weight of the particulate calcium source is −150 mesh Tyler Standard Sieve Series.

23. An agglomerate for use as a soil conditioner to neutralize soil acidity and provide a source of nutrient values, the agglomerate being formed by pelletizing a preagglomerate containing a water-soluble binder, a primary plant nutrient source providing a source of available nitrogen and a particulate calcium source comprising cement kiln dust, the proportions of the primary plant nutrient source and the particulate calcium source in the preagglomerate being sufficient such that the agglomerate comprises about 15% to about 60% by weight of the particulate calcium source and about 40% to about 80% by weight of the primary plant nutrient source, the combined concentration of CaO and other calcium-containing compounds having the potential to be hydrated in the preagglomerate being no greater than about 10% by weight, the preagglomerate containing at least about 1% by weight of the water-soluble binder, the agglomerate having a size ranging from −7 to +8 Tyler Standard Sieve Series exhibiting an average green crush strength of at least about 2 pounds.

24. The agglomerate as set forth in claim 23 wherein the primary plant nutrient source is selected from the group consisting of urea, ammonium nitrate, ammonium sulfate, alkali metal nitrates, mono and diammonium phosphate, bone meal slag and mixtures thereof.

25. An agglomerate for use as a soil conditioner to neutralize soil acidity and provide a source of nutrient values, the agglomerate being formed by pelletizing a preagglomerate containing a water-soluble binder, a primary plant nutrient source providing a source of potassium and a particulate calcium source comprising cement kiln dust, the proportions of the primary plant nutrient source and the particulate calcium source in the preagglomerate being sufficient such that the agglomerate comprises about 15% to about 60% by weight of the particulate calcium source and about 30% to about 80% by weight of the primary plant nutrient source, the combined concentration of CaO and other calcium-containing compounds having the potential to be hydrated in the preagglomerate being no greater than about 10% by weight, the preagglomerate containing at least about 1% by weight of the water-soluble binder, the agglomerate having a size ranging from −7 to +8 Tyler Standard Sieve Series exhibiting an average green crush strength of at least about 2 pounds.

26. The agglomerate as set forth in claim 25 wherein the primary plant nutrient source is selected from the group consisting of potash, potassium salts and mixtures thereof.

27. A process for forming an agglomerate containing cement kiln dust for use as a soil conditioning agent to neutralize soil acidity and provide a source of nutrient values, the process comprising:

preparing a preagglomerate containing a water-soluble binder and a particulate calcium source comprising cement kiln dust combined with at least one other calcium-containing secondary plant nutrient source selected from the group consisting of hydrated lime, limestone, dolomitic limestone, gypsum, quicklime and mixtures thereof, the particulate calcium source having a particle size distribution such that less than about 1% by weight of the particulate calcium source is +20 mesh and less than about 10% by weight of the particulate calcium source is −20 +100 mesh Tyler Standard Sieve Series, the combined concentration of CaO and other calcium-containing compounds having the potential to be hydrated in the preagglomerate being no greater than about 10% by weight, the preagglomerate containing at least about 1% by weight of the water-soluble binder;

pelletizing the preagglomerate to form the agglomerate; and drying the agglomerate, the drying being controlled such that dried agglomerates having a size ranging from −7 to +8 Tyler Standard Sieve Series exhibit an average green crush strength of at least about 2 pounds.

28. The process as set forth in claim 27 wherein the particulate calcium source has a particle size distribution such that less than about 20% by weight of the particulate calcium source is −100 +150 mesh Tyler Standard Sieve Series.

29. The process as set forth in claim 28 wherein the particulate calcium source has a particle size distribution such that at least about 50% by weight of the particulate calcium source is −200 mesh Tyler Standard Sieve Series.

30. The process as set forth in claim 29 wherein the particulate calcium source has a particle size distribution such that at least about 75% by weight of the particulate calcium source is −200 mesh and at least about 5% by weight of the particulate calcium source is −300 mesh Tyler Standard Sieve Series.

31. The process as set forth in claim 27 wherein the particulate calcium source has a particle size distribution such that at least about 95% by weight of the particulate calcium source is −100 mesh Tyler Standard Sieve Series.

32. The process as set forth in claim 31 wherein the particulate calcium source has a particle size distribution such that at least about 95% by weight of the particulate calcium source is −150 mesh Tyler Standard Sieve Series.

* * * * *